US009256774B1

(12) United States Patent
Koster

(10) Patent No.: US 9,256,774 B1
(45) Date of Patent: Feb. 9, 2016

(54) USING QUICK RESPONSE CODES TO GENERATE AN ELECTRONIC CONSENT DATABASE

(75) Inventor: Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 385 days.

(21) Appl. No.: 13/461,541

(22) Filed: May 1, 2012

(51) Int. Cl.
*G06K 7/10* (2006.01)

(52) U.S. Cl.
CPC .................................. *G06K 7/10821* (2013.01)

(58) Field of Classification Search
USPC ...................................................... 235/462.01
See application file for complete search history.

(56) References Cited

U.S. PATENT DOCUMENTS

| | | | |
|---|---|---|---|
| 6,694,298 B1 | 2/2004 | Teagarden et al. | |
| 6,810,260 B1 | 10/2004 | Morales | |
| 7,561,677 B2 | 7/2009 | Flynt et al. | |
| 7,916,846 B1 | 3/2011 | Farah | |
| 8,280,031 B2 | 10/2012 | Segall et al. | |
| 8,358,771 B1 | 1/2013 | Moore et al. | |
| 8,374,915 B2 | 2/2013 | Hayes, Jr. et al. | |
| 8,403,222 B2 | 3/2013 | Kindberg et al. | |
| 8,666,822 B1* | 3/2014 | Kaliss ................ | G06Q 30/0276 705/14.73 |
| 2002/0164006 A1 | 11/2002 | Weiss | |
| 2003/0032409 A1 | 2/2003 | Hutcheson et al. | |
| 2004/0028213 A1 | 2/2004 | Goss | |
| 2005/0149399 A1 | 7/2005 | Fukunaga et al. | |
| 2005/0265322 A1 | 12/2005 | Hester | |
| 2006/0036487 A1* | 2/2006 | Mann ................. | G06Q 30/0236 705/14.36 |
| 2006/0256957 A1 | 11/2006 | Fain et al. | |
| 2007/0094073 A1 | 4/2007 | Dhawan et al. | |
| 2007/0201646 A1 | 8/2007 | Metcalf | |
| 2008/0142599 A1 | 6/2008 | Benillouche et al. | |
| 2009/0029725 A1 | 1/2009 | Gerard Kindberg | |
| 2009/0082044 A1 | 3/2009 | Okuyama et al. | |
| 2010/0075634 A1 | 3/2010 | Miller | |
| 2010/0128862 A1 | 5/2010 | Vendrow | |
| 2011/0029380 A1* | 2/2011 | Moukas ............. | G06Q 10/0631 705/14.49 |
| 2011/0153398 A1* | 6/2011 | Tjhai ..................... | G06Q 30/02 705/14.14 |
| 2011/0173040 A1 | 7/2011 | Curtis et al. | |
| 2011/0182283 A1 | 7/2011 | Van Buren et al. | |
| 2011/0208578 A1 | 8/2011 | Bergh et al. | |
| 2011/0222679 A1* | 9/2011 | Tal ..................... | H04M 3/42195 379/211.01 |

(Continued)

OTHER PUBLICATIONS

Firmus Energy, Terms and Conditions, http://www.firmusenergy.co.uk/comp-terms-conditions.htm, 2011.*

(Continued)

*Primary Examiner* — Michael G Lee
*Assistant Examiner* — David Tardif

(57) ABSTRACT

Electronic consent for telemarketing calls can be obtained by soliciting consent from an individual using two-dimensional barcodes, such as quick response ("QR") codes. The QR code can be printed on an advertisement and read by a smart phone. The reading of the QR code causes communication to be originated from the individual's smart phone for the purpose of requesting the individual to be contacted for a particular purpose. The communication can be construed by the enterprise as providing electronic consent for the enterprise to contact the individual with a subsequent telemarketing call. The sender's telephone number and other relevant information can be stored in an electronic consent database used to ensure compliance with appropriate marketing regulations.

10 Claims, 9 Drawing Sheets

300

305
Destination Telephone Number:
4048511331

310
Message:
Please have someone call to tell me more information about the new Widget product.

(56) References Cited

U.S. PATENT DOCUMENTS

2011/0258156 A1    10/2011   Fitzpatrick et al.
2014/0115004 A1*    4/2014   Isaacs .................. H04L 67/306
                                                                707/784

OTHER PUBLICATIONS

Derek Johnson, SMS Marketing with QR Codes, May 27, 2011, Tatango, http://www.tatango.com/blog/sms-marketing-with-qr-codes/.*

Office Action received for U.S. Appl. No. 13/461,515 dated Apr. 16, 2013.

Office Action received for U.S. Appl. No. 13/470,757 dated Apr. 24, 2013.

9 QR Code Data Types, http://notixtech.com/blog/9_qr_code_data_types, Mar. 3, 2011.

Notice of Allowance Received for U.S. Appl. No. 13/461,513 dated Jun. 25, 2013.

Notice of Allowance Received for U.S. Appl. No. 13/971,093 dated Mar. 18, 2014.

Notice of Allowance Received for U.S. Appl. No. 13/461,515 dated May 23, 2013.

Corrected Notice of Allowance Received for U.S. Appl. No. 13/957,094 dated Jun. 17, 2014.

Office Action Received for U.S. Appl. No. 13/957,094 dated Jan. 10, 2014.

Notice of Allowance Received for U.S. Appl. No. 13/957,094 dated Mar. 10, 2014.

Notice of Allowance Received for U.S. Appl. No. 13/470,757 dated Jun. 5, 2013.

Notice of Allowance Received for U.S. Appl. No. 13/940,628 dated May 5, 2014.

Office Action Received for U.S. Appl. No. 14/242,081 dated Mar. 10, 2015.

Notice of Allowance Received for U.S. Appl. No. 14/242,081 dated Jul. 16, 2015.

* cited by examiner

| Link to Electronic Consent Data | Form | Telephone Number | Date Received | Campaign Identifier |
|---|---|---|---|---|
| http://permission.acme.com/4045551212 | SMS | 404 555 1212 | 03-1-2012 | 4125 |
| http://permission.acme.com/4045551228 | SMS | 404 555 1228 | 03-11-2012 | 4125 |
| http://permission.acme.com/7055560020 | Voice | 705 556 0020 | 03-15-2012 | 4742 |
| ... | | ... | | |

FIG. 6

USING QUICK RESPONSE CODES TO GENERATE AN ELECTRONIC CONSENT DATABASE

CROSS REFERENCE TO RELATED APPLICATIONS

This application is related to U.S. patent application Ser. No. 13/461,513, filed on May 1, 2012, and entitled Managing Electronic Consent For Calling Campaigns, and U.S. patent application Ser. No. 13/461,515 filed on May 1, 2012, entitled Integrating Two-Dimensional Barcodes and Embedded Links With Call Center Operation, the contents of both of which are incorporated by reference in their entirety for all that they teach.

BACKGROUND

Telemarketers may originate outbound calls to a list of telephone numbers from a call center on behalf of a client (e.g., an enterprise) to execute a calling campaign. The purpose of such calling campaigns may be telemarketing, informational, or other aspects related to providing customer service.

In the past, a call center could contact an individual for a telemarketing campaign on behalf of the enterprise under certain conditions using an autodialed, prerecorded voice call, and provided the enterprise had an established business relationship with the individual. For example, a bank issuing credit cards to its customers could contact these customers based on having an established business relationship with the customer. These calls were exempt from certain federal regulations that would otherwise prohibit pre-recorded telemarketing calls to the called party. However, new regulations require an enterprise to obtain express consent from the called party prior to initiating an autodialed, pre-recorded call to the called party. In many instances, the called party may find receiving the pre-recorded call useful and may provide advance explicit consent, including a request, for receiving such calls. Once this consent is obtained, then the enterprise can contact the individual. The enterprise needs to maintain the explicit consent, and must be able to produce the same if required to demonstrate compliance with regulatory requirements.

Obtaining consent from a user can be difficult and expensive. Providing a low cost and efficient approach for obtaining electronic consent is therefore needed to allow enterprises to effectively market their product and services and still comply with relevant regulations. It is with respect to these and other considerations that the disclosure herein is presented.

BRIEF SUMMARY

Technologies are generally presented herein pertaining to receiving electronic consent from an individual by an enterprise for the purpose of authorizing a subsequent telemarketing call. The electronic consent may be provided to the enterprise by the user employing a camera-equipped mobile phone to read a two-dimensional barcode, such as a quick response ("QR") code, provided on an advertisement. The electronic consent is stored in an appropriate form and is associated with metadata, allowing the electronic consent to be associated with the individual's telephone number, and searched and retrieved, if required. After receipt of the consent, then a call can be originated by a call center to that individual in compliance with regulations that require electronic consent prior to originating a call to the individual.

The subject matter disclosed herein may be implemented as a computer-controlled apparatus, a method, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 6 shows one embodiment of a process flow for updating a database with respect to voice and text type calls.

DETAILED DESCRIPTION

Figure 1:
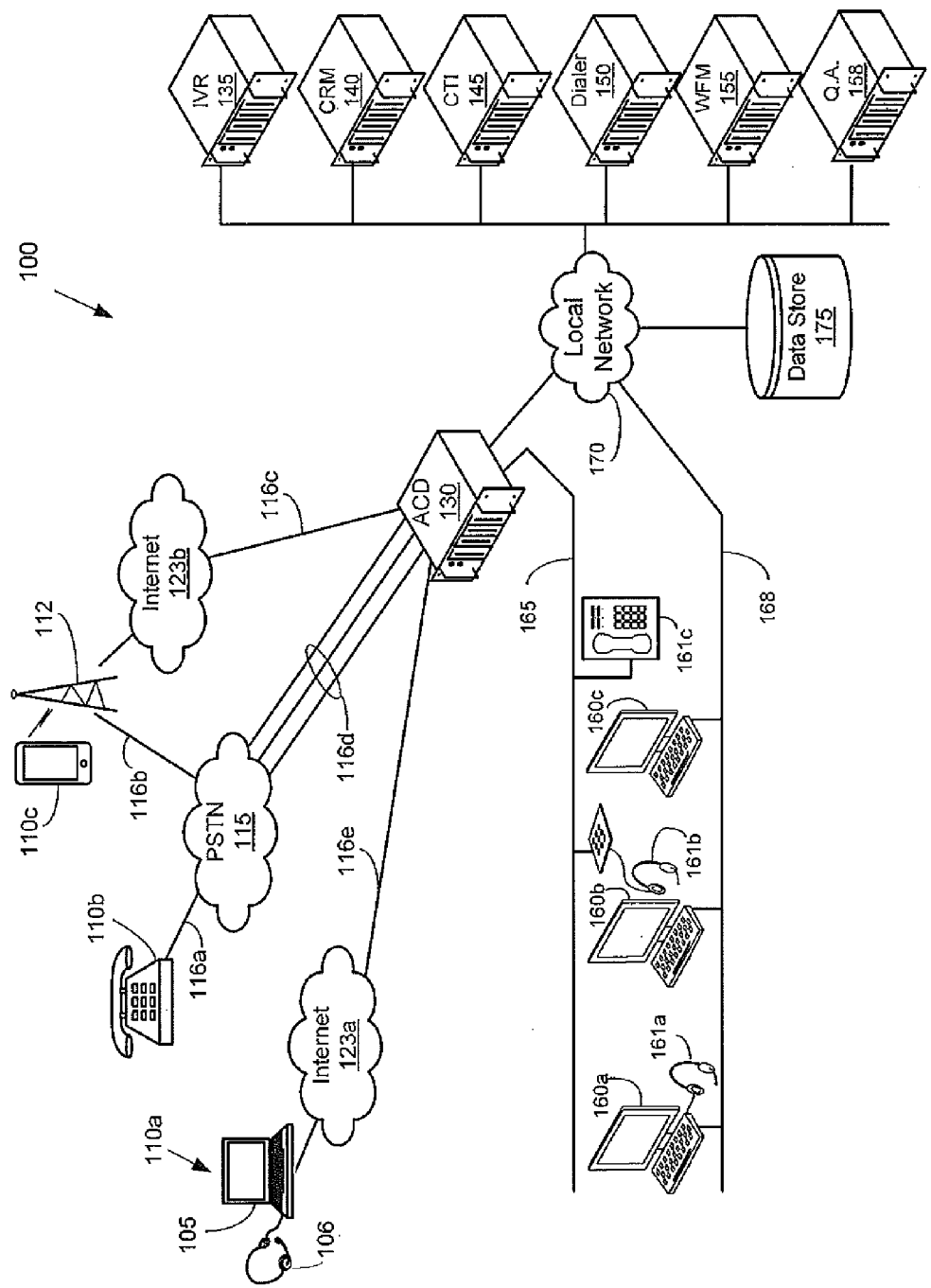
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process calls that are inbound-only, outbound-only, or a combination of both (sometimes referred to as a "blended" call center). Although many aspects of call center operation is disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from or placed to the party. The term "caller," if used, will generally refer to a party calling the call center, but in many cases this usage is exemplary. Thus, use of the term "caller" is not intended to necessarily limit the concepts herein to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile phone 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Voice calls may also originate from a calling party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile phone 110c, or other device known in the art. The term "call" as used herein may mean an active instance of two-way communication, an attempt to establish two way communication, or a portion of the two-way communication. For example, a user at a conventional telephone 110b can dial a telephone call in an attempt to establish two-way communication, and a call can be said to exist even prior to establishment of a two way connection. In another example, a call may be put on hold, and a portion of the call may be referred to as a "call leg" existing between the caller and certain equipment. A call may comprise a number of concatenated call legs, as known to those skilled in the art. In certain contexts, the call may encompass communications other than voice, e.g., text, email, video chat, facsimile, etc.

Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including, but not limited to, a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to either the data or voice capability at the agent's position as appropriate for the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

An agent typically logs onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service) to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data retrieved from the data store 175 are presented at the agent's headset 161*b* and their computer 160*b*. In other embodiments, data may be stored in the data store 175 by the agent, ACD, or other entity.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other servers, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160*a*-160*c*, as well as other components, may involve using a local area network ("LAN") 170. Other communication configurations are possible, such as, but not limited to, using a wide area network, wireless network, router, bridge, direct point-to-point links, etc.

When an agent is interacting with a called or calling party, the agent may use their workstation computer 160*b* to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, facsimiles, and the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, the dialer 150 may comprise a software module executing on a processing device hardware platform.

The dialer 150 is typically configured to dial a list of telephone numbers to initiate outbound calls, which can be accomplished in one embodiment by instructing the ACD 130 to originate calls. In some embodiments, the ACD may include functionality for originating calls, and if so, this component may be referred to as a private automatic branch exchange ("PBX" or "PABX"). In other embodiments (not shown), the dialer 150 may directly interface with voice trunks using facilities 116*c*, 116*d* to the PSTN 115 for originating calls. After the calls are originated, a transfer operation by the ACD 130 or by the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in a call center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to then generate a work roster of agents. In other words, the WFM server 155 schedules agents for their work shifts according to the anticipated needs of the call campaigns.

Finally, in various embodiments, the call center architecture 100 may include another server 158 to perform various functions. For example, the server 158 could be a quality assurance system that records communication fielded by an agent or allows a manager to monitor a voice session to ensure calls are being handled correctly.

Although the above components are referenced as "servers," each may be also referred to in the art a "processing device", "unit," or "system" and may incorporate a local data store, database, or interface with an external database. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into single hardware platform executing one of more software modules. In addition, the call center architecture 100 may be provided as a hosted solution, where the call processing functionality is provided as a communication service (a so-called "communication as a service" or "CaaS") to a call center operator. Thus, there is no requirement that the servers identified above actually be located or controlled by a call center operator.

In addition, the agent positions can be co-located in a single physical call center or in multiple physical call centers. The agents can be remotely located from the other components of the call center, and may also be remotely located from each other, sometimes referred to as a "virtual call center." A virtual call center may describe a scenario where agents to work at home, using their own computer and telephone as a workstation. In some configurations, a single physical location of the call center may not be readily identifiable. This may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, configurations, facilities, technologies, and equipment used. For example, various algorithms and queuing arrangements maybe defined to efficiently process calls. In other configurations, the ACD 130 may be configured to process not only voice calls, but also other forms of communication, and perform corresponding call processing functions for email, text, or facsimile calls. Alternatively, a web server (not shown in FIG. 1) may receive or originate email and text communications, as well as interact with other call center components.

Figure 2:
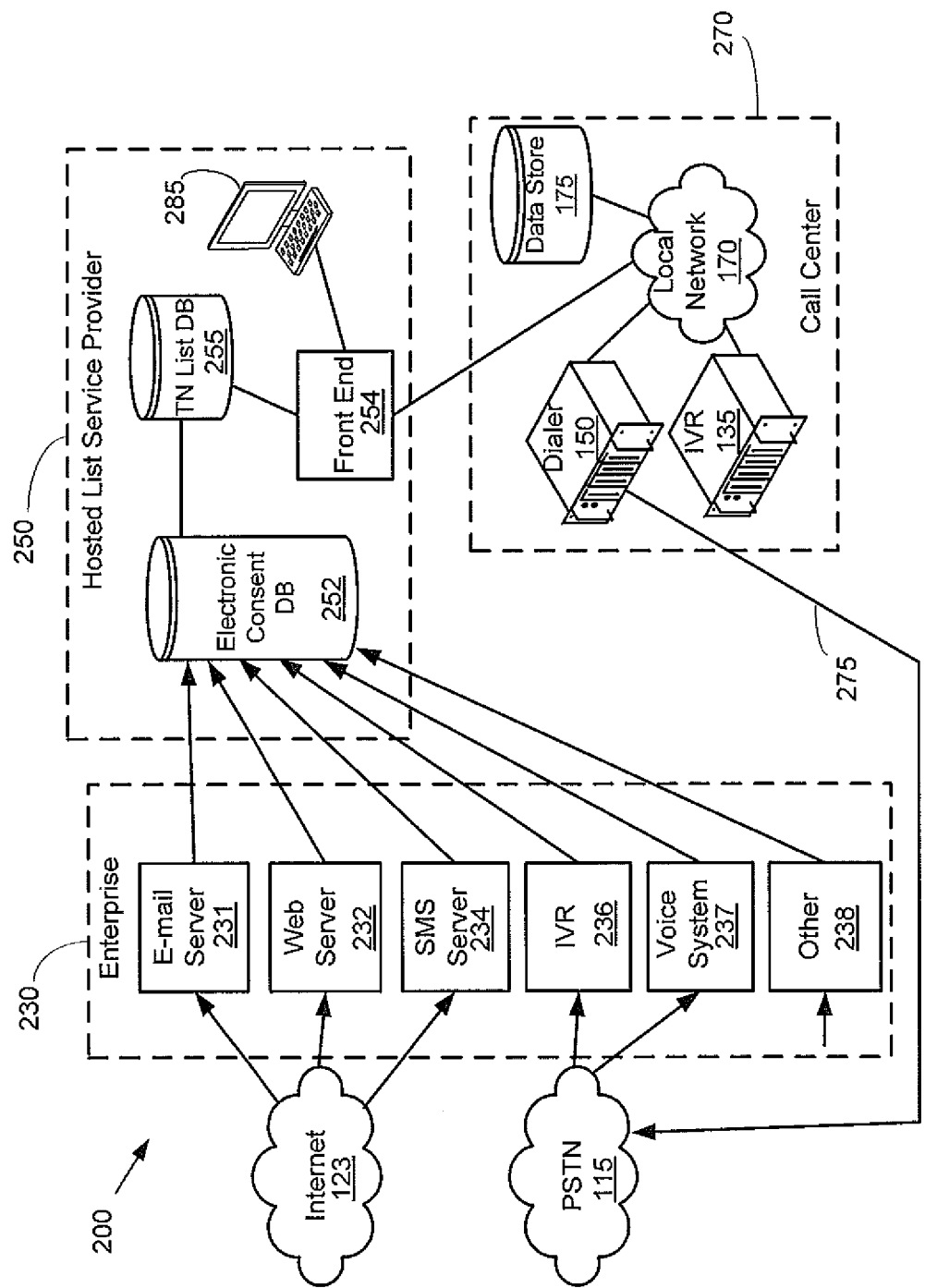
FIG. 2 shows one embodiment of the relationship between an enterprise, a hosted list service provider, and a call center in regards to managing electronic consent for outbound calls.

Relationship Between an Enterprise, Hosted List Service Provider, and Call Center FIG. 2 illustrates one embodiment of the relationship 200 between an enterprise 230, a hosted list service provider ("HLSP") 250, and a call center 270. The enterprise 230 could be any form of commercial business (as well as a non-profit organization or business), and is presumed to have a list of contact information of individuals that it seeks to interact with. Interaction may occur by a call center operated internally to the enterprise, or a third party external call center. This list may be a list of customers and may include their names, telephone numbers, purchasing history, and other information that may be maintained by a customer relationship management system or other information system. Although the term "customer" may be used, this term should not be interpreted as being constrained to only referring to individuals that have purchased, may purchase, or otherwise are consumers of the enterprise 230. The individual could be, for example, a patient receiving health related information, a student receiving school closing information, etc. Correspondingly, the enterprise could be a non-profit medical clinic, a school, etc. However, for purposes of illustration and simplicity, the individual providing the electronic consent is referred to as a "customer" and the organization to which it is provided is the "enterprise."

The customer may provide the enterprise 230 with express electronic consent for the purpose for receiving an automatic pre-recorded voice call, such as for telemarketing purposes. In other embodiments, the consent may be for receiving a short message service ("SMS") message call, facsimile, email, or other form of communication.

The enterprise 230 may maintain various systems that facilitate receiving customer contact. These systems may include an email server 231 that may receive email communication from the Internet 123. However, the unstructured content of an email message may make accurate computer processing difficult, and hence require a human to read the contents. Customers may also interact with a web site hosted by a web server 232. A web site allows customers to easily provide structured information, such as their name and telephone contact information, which can be easily processed by computing devices. Typically, the email server 231 and the web server are connected to the Internet 123 for receiving customer originated communication.

Further, the enterprise could also receive instant messages at an SMS server 234. Although SMS messages may be conveyed by specialized signaling networks, it is possible in some embodiments for the SMS server 234 to receive such message via the Internet 123. In particular, gateways for converting messages from an SMS message to an email message are known to those skilled in the art. Thus, it is possible to receive the contents of an SMS message in an email. The SMS server 234 may perform, or be connected to, such a gateway type of function. Other configurations for sending/receiving text messages in the form of SMS are possible.

Other forms of access provided by the enterprise for customer contact may include an IVR 236. The customer can use the telephone for accessing an automated IVR 236 that may collect customer consent information. Another form of access is a voice system 237 which may direct an incoming call from a customer to an agent (such as those described in FIG. 1). In addition, other forms of communication 238 can be provided. For example, customer input could be provided via written communication, such as facsimile or postal mail. These communications may be processed by the enterprise, with corresponding information entered into customer relationship management systems.

Each of these communication approaches may involve a distinct infrastructure for processing the communication. The technology for email servers, web servers, and IVRs are well known, as are the infrastructure and technology required to handle voice calls, SMS, or other forms of communication. Each communication approach can potentially be used by the enterprise 230 to receive "electronic consent" from an individual indicating authorization to receive future communication. The electronic consent includes digital or electronic signatures, and would encompass any form of indication sufficient to be recognized as consent. Various forms of express consent are possible, including those identified by the Electronic Signatures in Global and National Commerce Act ("E-SIGN"). Although this is sometimes referred to by others as "written consent," this is recognized as allowing voice consent to be a recognized form of consent.

For example, an airline may provide information at its web site for a potential customer seeking information on upcoming airfare sales to certain locations. The individual may indicate preferences for locations, days, and indicate a telephone contact number for receiving automated calls. The web site can also expressly request the user to provide electronic consent. The request for this information may be received at a web server 232 that provides an easy-to-use interface that can be used to forward the individual's telephone number for inclusion into a notification list. Indicating consent can be accomplished by the user typing in their name in an appropriate location with appropriate indications.

For each communication approach that a customer may use to provide consent to the enterprise 230, the enterprise 230 may maintain a digital record of the consent provided. With regard to email, completing a web page, or sending a SMS message, the data itself can be easily retained as an electronic record. For example, a customer completing a web page indicating their name, telephone number, and selecting a check box authorizing receipt of future communications is evidence the user provided electronic consent. The consent can be retained in different formats. For the IVR or voice system, voice conversations with an agent or keypad responses provided to an IVR can be digitally recorded and/or analyzed as evidence of consent. For other forms, paper forms or letters can be scanned into any number of the well known file formats, such as JPEG or PDF files, and stored as digital image files. Each instance of electronic consent can be treated as a distinct electronic consent file, or they can be records within a single consent file.

With each electronic consent data file it is necessary to define corresponding electronic consent metadata ("metadata"). This metadata provides information about various aspects of the electronic consent data, including the individual it is associated with, when the electronic consent was obtained, how the electronic consent was received, etc. The metadata is linked to each corresponding electronic consent data file, allowing retrieval and review of the electronic consent data files. In one embodiment, the metadata includes a telephone number, so that verification of electronic consent can be easily retrieved and verified using the individual's telephone number. The metadata can serve as an index to retrieve the electronic consent data file, and may include other information, such as the individual's name, address, etc.

While each of the server/systems 231, 232, 234, 236, 237, and 238 may retain a copy of, or a link to, the electronic consent data file in a database, having each server/system retain a copy means that the various instances of electronic consent data files are maintained in a distributed manner throughout the enterprise. Auditing a user's consent is complicated by having to check with the various systems that must be examined to ensure that an accurate summary is determined. It becomes difficult to manage a logical set of data when it is stored and independently managed on distinct systems. Further, updating the consent (e.g., to withdraw consent) is difficult when multiple data stores are maintained.

It is preferable to have a central repository of electronic consent records. To simplify record keeping and other related functions, each enterprise system 231-238 may provide a copy of the electronic consent data it receives to an electronic consent database 252. The electronic consent database 252 is a central repository and is able to store, index, and retrieve the electronic consent in various forms, including, but not limited to: scanned image files, voice recordings, text, HTML, email, etc.

The electronic consent database 252 may be operated by a hosted list service provider 250 as opposed to an enterprise. The hosted list service provider 250 can offer the list management services for various enterprises, and it can provide a common, single repository for electronic consent for the enterprise 230. Because the list service provider provides a computer service to the enterprise, it can be referred to as "hosted." Thus, typically a network service is used to transmit the data from the enterprise 230 to the hosted list service provider 250. When referring to a "list management provider" herein, this refers to an entity that can provide the services either on a fee-for service basis (and is then considered a hosted list service provider) or internal to a call center or enterprise (which may not be on a fee-for service basis). The hosted list service provider can provide efficient storage, retrieval, and updating of the electronic consent. Further, other economies of scale can be provided, as the hosted list service provider can "scrub" the data using other databases. As will be seen, the contents of the electronic consent database need to be harmonized with other databases which may indicate other restrictions associated with the telephone number. For example, the data can be checked or identified as being a wireline or wireless number. This becomes important as individuals may port their wireline number to their wireless number.

Although not shown in FIG. 2, there may be a number of different locations associated with a single enterprise, or multiple distinct and diverse enterprises, that provide electronic consent data to the hosted list service provider 250. The hosted list service provider 250 may be based on a cloud computing platform that provides a reliable, centrally identifiable, database for the enterprise. Simply maintaining a central repository for a location of the enterprise 230 may not be sufficient to access electronic consent for the overall enterprise, since many enterprises have multiple locations which can receive customer authorization. If each enterprise location has its own central repository, then the issue of managing multiple databases still exists. The hosted list service provider may render an invoice of the fee for its service to the enterprise, which can be computed based on the number of telephone numbers involved, storage capacity required, etc. The hosted list service provider may also provide value added services of verifying telephone numbers against other databases, such as state or federal do-not-call ("DNC") databases or wireless number lists.

The hosted list service provider 250 is well positioned to compare the telephone numbers in the electronic consent database received from an enterprise 230 with telephone numbers in the DNC databases, which may be periodically updated. For example, if an individual has previously requested that their telephone number should be included in a DNC database, and then later explicitly provides written consent to an enterprise for receiving calls, the fact that the written consent was provided subsequently can be interpreted as the individual authorizes calls from that enterprise, but not other entities. On the other hand, if the individual subsequently requests their telephone number to be included in a DNC database after having explicitly provided written consent, then that could be interpreted as having withdrawn all prior express written consent. The user's intentions may be based on how and when they are made. For example, an individual may update a state DNC list by communicating with a state agency, not realizing that this may preclude receiving communication from an enterprise in that state that the user does want to receive. In this case, the hosted list service provider 250 could inform the enterprise 230 of this occurrence, and the enterprise could contact the individual to clarify the authorization status. It would be beneficial for the enterprise to be able to contact the individual and then reinstate express consent for future communications. The enterprise may contact the individual using a telephone call by an agent, or an automatically dialed call with an IVR to verify the status. In some embodiments, the hosted list service provider may maintain an email database which may include an email or SMS address for the individual. Thus, for example, an email could be transmitted to the individual as another approach for reestablishing or confirming electronic consent in such a circumstance, where the email may not be subject to the same regulations governing calls.

Although FIG. 2 depicts the enterprise 230 providing the electronic consent data directly to the electronic consent database 252, the hosted list service provider 250 may require the electronic consent data to be provided to the call center through a front end system ("front end") 254 (this arrangement is not depicted in FIG. 2). The front end 254 may incorporate various interfaces for receiving and transmitting queries, responses, and files, as discussed below.

The hosted list service provider 250 can store the electronic consent in the electronic consent database 252, and can also maintain, in one embodiment, a separate database of telephone numbers ("TN") in a TN list database 255. The TN list comprises a list of telephone numbers associated with the electronic consent, but may not contain all the information found in the electronic consent database. Frequently, the TN list, not the electronic consent data, is provided to the call center for performing the calling campaign. Although FIG. 2 shows the TN list as a separate list from the electronic consent database 252, the TN list can be stored in the same database and/or other structure as the electronic consent database 252 by the hosted list service provider 250. In some embodiments, the electronic consent data may also be provided to the call center. The TN list may comprise a subset of the metadata of the electronic consent data used by the call center to perform call origination. This TN list may be generated by processing the metadata from the electronic consent, or may be populated by other means. Because of the linkage maintained between the electronic consent and the telephone number, it is possible for the hosted list service provider to easily verify the corresponding electronic consent for each telephone number in the TN list.

The hosted list service provider may make available, or provide, the telephone numbers in the TN list to the call center in different ways. In one embodiment, the TN list may be transmitted to the call center 270 as a file. This type of arrangement "pushes" the TN list to the call center, which stores the TN list in the data store 175. The call center 270 can then originate calls using the telephone numbers as defined by the calling campaign parameters. Alternately, groups of TN lists can be periodically transmitted to the call center (e.g., those required for each day of operation).

In another embodiment, the call center 270 may query the hosted list service provider on an "as needed" basis. This could be, for example, prior to initiating each call. The dialer 150 could launch a query to the front end 254 for each originating call. In other embodiments, the dialer may launch a query for a group of numbers prior to initiation, or for the entire day's file. This type of arrangement "pulls" numbers from the hosted list service provider 250 as needed and allows the call center 270 to obtain the appropriate telephone number information in real-time. This approach allows the hosted list service provider to provide an up to date status of telephone numbers.

In either the "push" or "pull" arrangement, the telephone numbers are transmitted from the hosted list service provider to the call center via a front end 254. The front end 254 can process queries in the "pull" data access arrangement, and perform various gate keeping functions. These functions include verifying that an allowed source (e.g., call center) is authorized to access and request the TN list from the hosted list service provider and ensures the rate of access is within allowed limits. For example, if a query is made for each TN prior to origination, a maximum rate at which queries can originate may be monitored. If the request is made for an entire TN list, then appropriate verification is required to ensure that the TN list can be provided to that call center. Because various call centers may be receiving numbers from the same hosted list service provider, each call center must be identifiable and must receive the appropriate TN list. Thus, each list may be associated with a particular call center, and a campaign in that call center.

Once the call center 270 receives the numbers, these can be cached or otherwise stored in the call center's data store 175, or within the main memory of the dialer 150. The dialer 150 can then use the telephone number to originate an outgoing call using, e.g., trunks 275 connected to the PSTN 115. Although the calls may originate using trunks, this should not be construed as limiting the type of access that can be used by the dialer 150. In other embodiments, the call can be a SMS message addressed to the (wireless) telephone number that is based on pre-recorded message content.

The dialer 150 can automatically dial a pre-recorded voice call and play a message. In various embodiments, the called party may be connected to an IVR 135 for further interaction, in a manner that is well known to those skilled in the art. Furthermore, in some embodiments, the caller may choose to opt-out from receiving further pre-recorded calls. If the user elects to opt out, that information may be recorded by the IVR and copied into the data store 175, along with other call progress information that occurred. In other embodiments, the called party may speak to an agent. Typically, a log of call progress information is maintained for each of the dialed calls of a campaign, including whether an opt-out indication was received from the called party. This log is typically stored in a call log database that provides information about the call, including when it was made and the outcome.

The opt-out information comprises an indication associated with a telephone number which the call center may report back to the hosted list service provider 250. The opt-out information is relevant to managing the TN list database 255. Specifically, called parties that opt-out from such calls are noted so that subsequent calls are not made to that party.

The front end 254 is involved in ensuring that the opt-out numbers are properly processed from the call center. Thus, the front end 254 ensures that the call center 270 is authorized to indicate the information for modifying the TN list. Once the front end 254 receives the information, it updates the TN list in the TN list database 255. The front end 254 may also update the electronic consent database to update the metadata to reflect that the electronic consent is no longer valid. In some embodiments, a record of the opt-out request can be stored, along with the date, time, and campaign for which it occurred with by the hosted list service provider. In some instances, the opt-out request only is for a particular enterprise.

The hosted list service provider may also provide access to the electronic consent database 252 by an administrator, regulator, enterprise, or other third party. Access may be provided to a computer 285, which can access the electronic consent database 252 or the TN list database 255. In one embodiment, a graphical user interface is provided that allows the computer operator to request to view the electronic consent information for a given telephone number. The front end system 254 processes the information and retrieves the appropriate record, and provides the result to the computer for display. The information can be provided in a form that is appropriate for the consent data stored, e.g., as a web page, a PDF file, text string, or voice recording, which can be played back using any one of the well known media players or viewing programs at the computer 285. Thus, third party verification of the electronic consent data is readily possible.

Reports can be generated by the hosted list service provider detailing summaries of the disposition of each telephone number in a TN list. This includes when and to whom the TN list was provided and after completion of the calling campaign by a call center, how many of the telephone numbers resulted in an opt-out and when. These reports can be obtained or provided to the enterprise, regulatory agencies, or a third party. In other embodiments, agents of the call center 270 are able to retrieve the electronic consent data directly, and are able to deliver it to a third party computer, e.g., in an email, if requested.

Additional aspects of managing electronic consent are detailed in the aforementioned co-pending patent applications.

Quick Response Codes

Quick response ("QR") codes are two dimensional barcodes which can encode information. Typically, a camera-equipped mobile smart phone "reads" the QR code by executing an appropriate mobile application. There are various standard or proprietary forms of two-dimensional barcodes, and for illustrations purposes, the two-dimensional barcode known as a QR code is used to illustrate the concepts herein, since this is a common format.

QR codes can indicate an action to be performed by the mobile phone and data to be used in performing that action. The actions include: storing contact information, processing a calendar event, creating an email, indicating a telephone number to dial, providing geo-location information to an application, sending an SMS message, displaying text, logging onto a Wi-Fi network, and other actions. In many embodiments, the smart phone mobile application is designed so that user input may be required before completing the action that operates using the data. For example, the QR code can load data for initiating a telephone call or sending an SMS message, but the mobile application will request user confirmation before doing so. This is considered by some to be a preferred design in some instances as opposed to automatically originating the phone call or sending the SMS message. This is controlled by the application, however.

More specifically, when reading a QR code for sending an SMS message, the QR code can convey the destination address (e.g., the mobile telephone number or a short code) that is to be used, and pre-populate the contents of the text portion of the SMS message. Thus, the user does not have to enter this information in the text body, which avoids the user accidentally mistyping the information or incorrectly completing the information.

Figure 3:
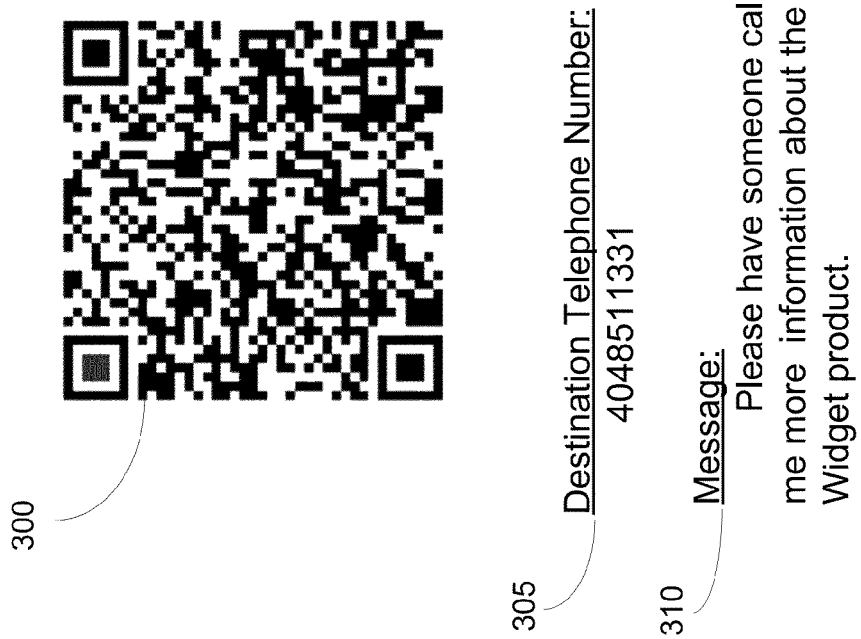
FIG. 3 shows one embodiment of the process flow for a hosted list service provider to manage electronic consent for a list of telephone numbers.

Turning now to FIG. 3, an example of a QR code 300 is illustrated. This QR code can be generated using various readily available software programs. To generate the code, an action can be selected and the appropriate data entered, and the QR code is generated, which can be copied, printed, etc. In this embodiment, the QR code indicates the action that generates an SMS digital text message. The QR code also indicates data to be used, which is the destination telephone number 305, which in this embodiment is 404 851-1331. The data further comprises the text portion or body of the SMS message 310, which is "Please have someone call to tell me more information about the new Widget product." In other embodiments, the request could indicate a specific form communication or the return time for the communication (e.g., "please have someone telephone me at 2:00 p.m." or "please have someone text me"). The application and the information requested can greatly vary, and may provide healthcare related information, product support information, promotional information, discount information, coupons, special offers, travel reservations information, etc.

Although not shown in FIG. 3, the contents of the QR code may include other context information that is specific to an individual. For example, if the QR code is printed on a prescription bottle for John Doe, the message could be encoded to state: "Please have someone call me, John Doe at 404 555-1212, to confirm when my prescription refill will be available." Note that the telephone number in this text is not the same as the destination telephone number 305, which is the destination telephone number of where the text message is to be sent. The telephone number in the text is provided in the data from the QR code, and could have been obtained from e.g., a pharmacy prescription refill system along with the name of the individual and other contextual information. In other contexts, a security code could be embedded which can be used to aid the recipient in identifying and verifying the sender or the context of the communication. In this embodiment, the use of the QR code is not for a promotional application, but for a healthcare informational application.

Overview of Message Flow

Various embodiments of using QR codes to provide electronic consent information are discussed below in conjunction with FIGS. 4A-4C. These figures illustrate variations as to how information associated with a QR code can be received at different entities, and how this information may be used to update the various components. Further variations are possible, and those skilled in the art will be able to develop further variations in light of the present disclosure and the disclosure of the aforementioned patent applications.

Figure 4A:
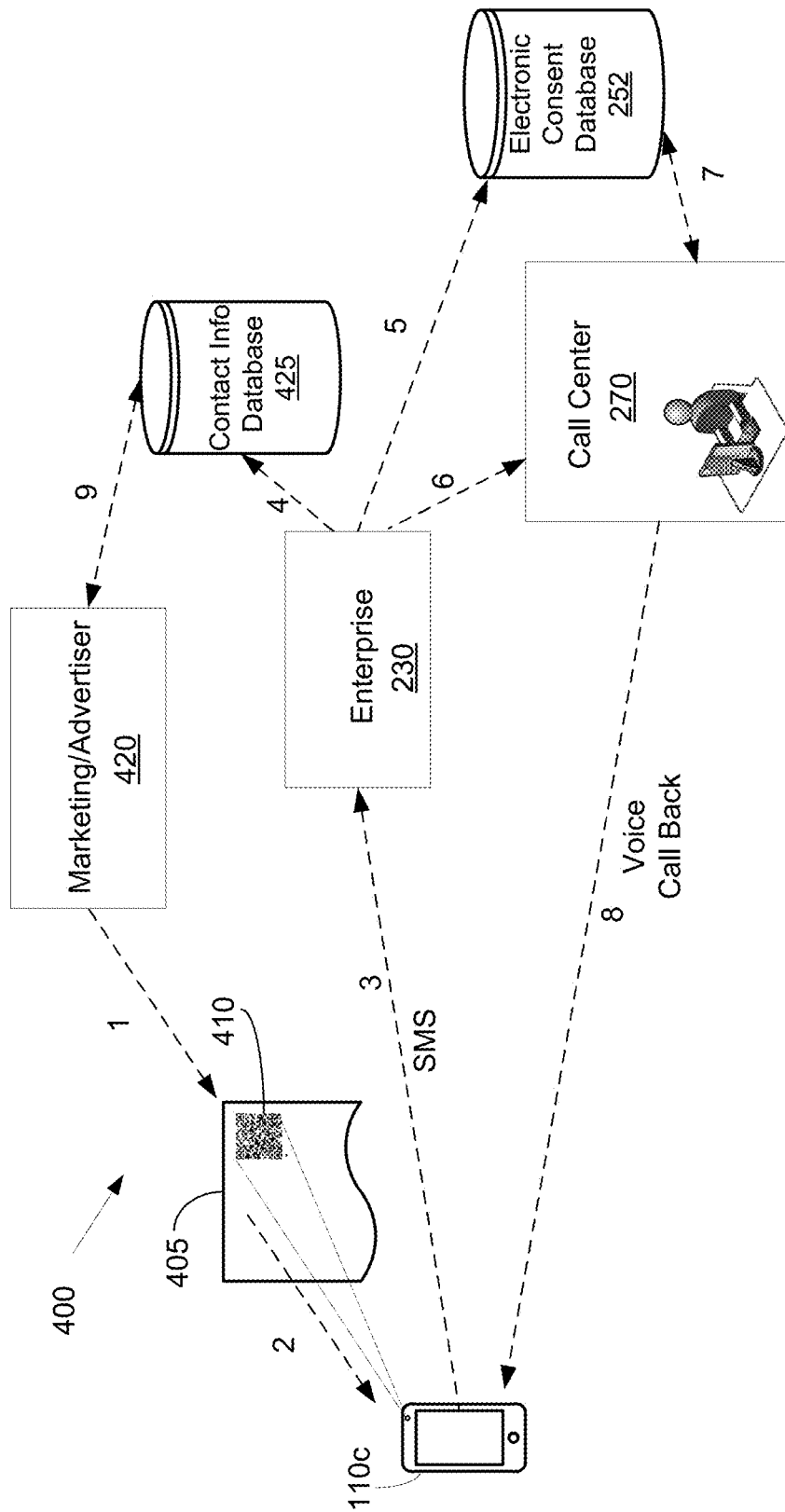
FIGS. 4A-4C show embodiments of message flows involving components in the hosted list service provider and the call center.

Turning to FIG. 4A, a system 400 is disclosed that comprises the enterprise 230 previously introduced in FIG. 2, albeit in a simpler diagrammatic form, as is call center 270. The electronic consent database 252 that was also previously discussed is shown as well. The contact information database 425 represents information regarding individuals that have requested follow up communications (e.g., those individuals that have provided electronic consent). The contents of the contact information database 425 may be similar with respect to the electronic consent database 252, as will be seen from the discussion below. In some embodiments, the records in the database can be comma-separated-values.

FIG. 4A illustrates a marketing/advertiser 420 that can develop, define, and deploy an advertising campaign. The marketing/advertiser 420 can define the content of the advertising campaign, define the deployment means, arrange for advertising materials to be generated, and distribute the printed materials. This could be performed by the enterprise 230, but in many cases a third party marketing/advertiser 420 is used. The marketing/advertiser 420 may enlist the services of others, such as a publisher, promoter, etc. The advertising materials can comprise various forms, including printed media, television, billboards, cards, brochures, direct mailings, etc. One form shown in FIG. 4A is printed advertising material 405, which could be for example, an advertisement in a magazine. The printed material has indicia representing the QR code 410.

The process flow operations are numbered based on information that can be transmitted. The logical operations described herein can be implemented as a sequence of computer implemented acts or as one or more program modules running on a computing system and/or as interconnected machine logic circuits or circuit modules within a computing system. The implementation is a matter of choice dependent on the performance and other requirements of the computing system. Accordingly, the logical operations described herein are referred to variously as states, operations, acts, or modules. These operations, acts, or modules may be implemented in software, in firmware, in special purpose digital logic, and any combination thereof. Greater or fewer operations may be performed than shown in the figures and described herein. These operations may also be performed in a different order than those described herein.

The first step 1 occurs when the marketing advertiser generates and distributes the printed material 405 bearing the QR code 410. The printed material 405 can be distributed to the public in general, or to a target audience using various delivery mechanisms. A user that is targeted (not shown) is presumed to be operating a camera-equipped mobile phone 110c used to read the QR code 410 in the second step 2. This results in the information encoded in the QR code 410 to be processed by the mobile phone 110c.

As noted before, the QR code 410 can be used to convey an action and data, where the data is used in conjunction with performing the action. In this embodiment, the action is populating an SMS message. The information could be as indicated as shown in FIG. 3. Namely, a destination telephone number may be indicated along with text for the message body using the QR code 410. The mobile application may be programmed to obtain user input to confirm the sending of the message, or may initiate the SMS message without confirmation.

Step three 3 results in the SMS message transmitted to the enterprise 230. The infrastructure required to transmit the SMS message is not shown, and the destination telephone number is used by the SMS infrastructure to route the message in a manner well known to those skilled in the art of SMS messaging. In other embodiments, the message could be addressed using an SMS short code.

The enterprise 230 may have various campaigns in progress. In one embodiment, the calling campaign may be determined by using a unique destination telephone number for each calling campaign. Thus, one destination telephone number identifies a corresponding calling campaign and another destination telephone number identifies another calling campaign. However, since the printed material 405 may exist longer than the campaign, and could be read for several months or years after first produced, the advertiser may be required to dedicate the destination telephone number for that campaign for some time. Further, there may be a number of calling campaigns in progress, and this may require allocating a number of telephone numbers, one for each calling campaign. In another approach, a single destination number can be used, and the text in the SMS body is used to identify the particular campaign. The text could be processed for examining, e.g., a keyword, phrase, sentence, or code. In this manner, multiple campaigns could overlap and share the same destination telephone number. It would be more efficient with respect to telephone number allocation to simply ensure that the SMS text body is unique for each advertising campaign, and hence for each calling campaign. However, either approach may be used to determine the calling campaign.

Once the enterprise 230 knows what calling campaign the message is associated with, the enterprise may record this information in a contact information database 425 in step four 4. The contact information database 425 could be, for example, a database that stores each user's initiated SMS message. The contact information database 425 may store the SMS message, including the received date or the current date, and the associated campaign. The campaign may be identified by a campaign identifier. The campaign identifier could be, e.g., a name or a number uniquely associated with the campaign.

The enterprise 230 could also perform step five 5, which is to provide a copy of the text message to the electronic consent database 252. This database may be distinct from the contact information database 425. The electronic consent database 252 may be restricted as to access or other permissions. The electronic consent database 252 can be used and retrieved to demonstrate compliance with various communication regulations, whereas the contact information database 425 may be used for marketing intelligence, and monitoring the effectiveness of the campaign. Further additional information may be stored in the records of one database relative to the other.

The enterprise 230 may also provide the originating telephone number to the call center 270 in step six 6, along with a campaign identifier, to contact the individual. As a matter of course, the call center 270 may consult the electronic consent database 252 in step seven 7 to confirm that electronic consent is present for the individual prior to originating a call back. The electronic consent database 252 may accept a query for an indicated telephone number, along with an optional enterprise identifier, and provide an indication whether electronic consent is present for the indicated telephone number and/or for that enterprise. In various embodiments, the electronic consent database may store various campaigns, and various enterprise identifiers, so that mere indication of a target telephone number may not be sufficient to indicate whether electronic consent exists or not. For example, the individual associated with the telephone number may have provided electronic consent for company A, but not for company B. Thus, to respond to a query, the electronic consent database requires the telephone number and enterprise identifier to respond with an indication of whether electronic consent is on record from that individual.

After confirmation, the call center 270 is able to initiate the call back to the individual. Preferably, the call center 270 calls back the mobile phone 110*c* in a timely manner in step eight 8. In some embodiments, the return call can be within minutes from when the mobile phone sent the SMS message in step three.

The contact information database 425 maintains information about who has sent a communication in response to reading a QR code. This information may be accessed by the marketing/advertiser 420 to determine the effectiveness of a particular campaign. For example, an enterprise 230 may have two simultaneous print advertising campaigns directed to the same product, and the responses stored in the contact information database 425 can be used to determine which print media campaign (each having a unique QR code) was more effective. The access by the marketing/advertiser 420 with the contact information database 425 is shown at step nine 9. It should be recognized that the steps above can vary from the order presented, and not all steps are required to be performed in the order disclosed.

Figure 4B:
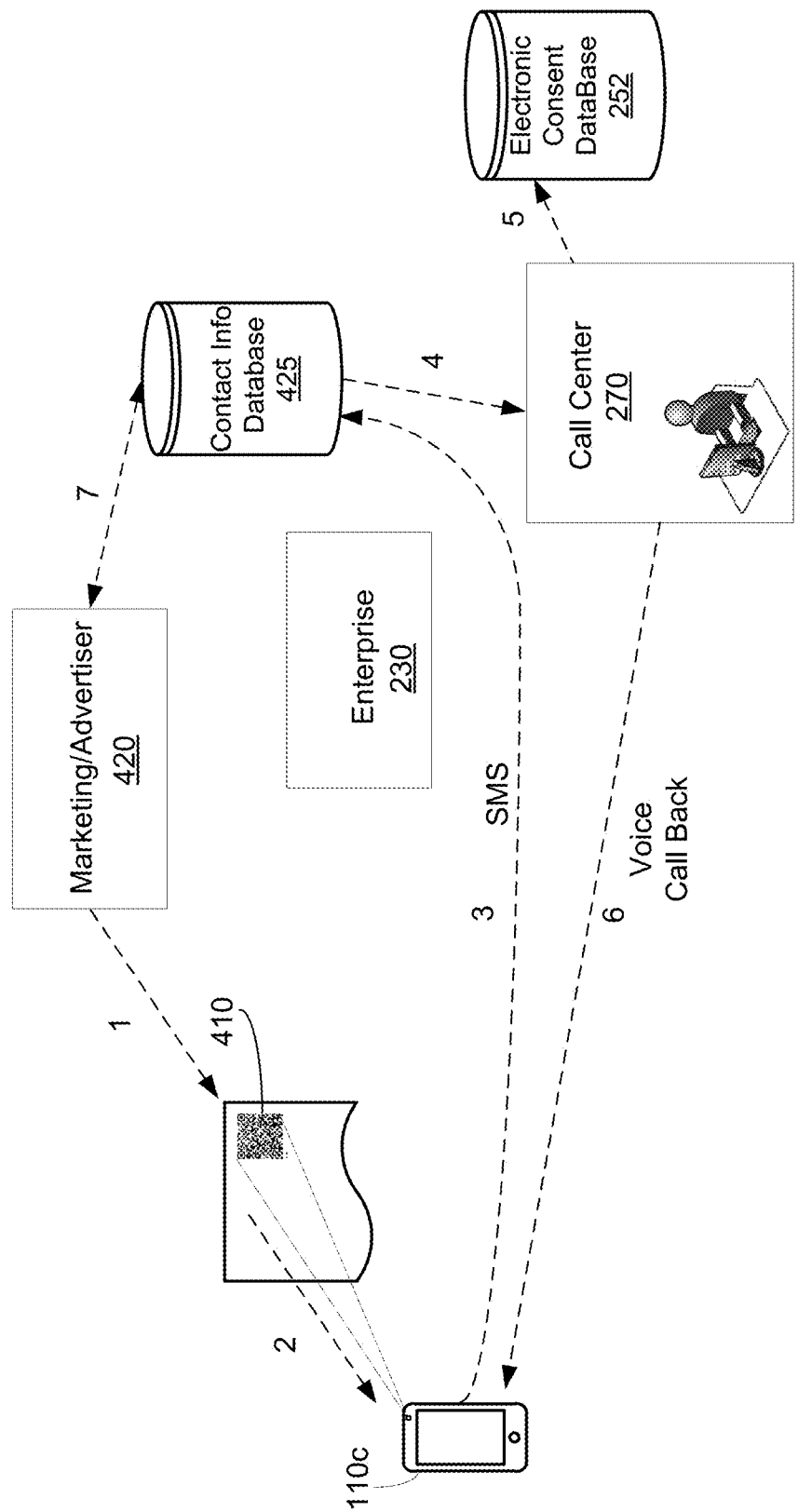

FIG. 4B illustrates a variation that can occur with respect to the above steps. In FIG. 4B, the same components are illustrated, but with a different order of the interaction and messaging. Starting with step one 1, the marketing/advertiser 420 causes a printed QR code 410 to be made available on a printed material 405. The user (not shown) operating the mobile phone 110*c*, reads the QR code 410 in step two 2. The encoded information is now processed in the mobile phone, and comprises the destination address and the text body of an SMS message. In step three 3, the SMS message is transmitted.

In this embodiment, the SMS message is copied into the contact information database 425. This may be operated or controlled by the enterprise 230, or may be operated and controlled by the marketing/advertiser 420. In other embodiments, this database could be operated or controlled by the call center 270.

The contact information database 425 then in step four 4 notifies the call center of the electronic consent received from the mobile phone 110*c*. The call center 270 is responsible for updating the electronic consent database 252 and does so in step five 5. In this embodiment, the call center 270 maintains the electronic consent database 252 on behalf of the enterprise. Consequently, the call center 270 already knows that electronic consent for that telephone number was received, and the call center 270 does not have to then initiate a per-call query to the electronic consent database 252 to verify that consent was received. The call center 270 in step six 6 then initiates the voice call back to the mobile phone 110*c*. As in the prior case, the marketing/advertiser 420 can monitor the status of the contact information database in step seven 7.

Figure 4C:
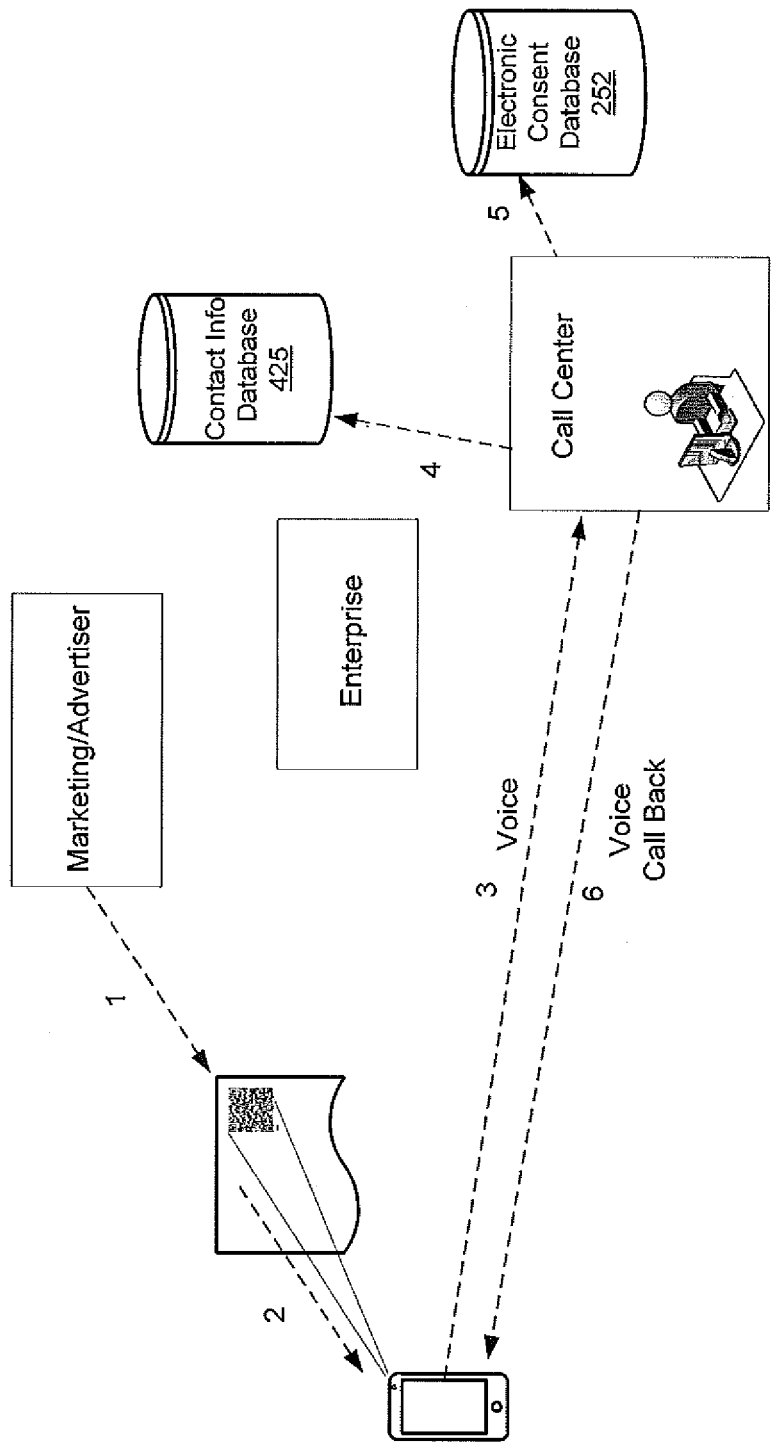

Another variation of the message flow is shown in FIG. 4C. In this embodiment, as will be seen, the QR code 410 does not cause a text message to be generated from the mobile phone 110*c*, but is encoded to cause the mobile phone to dial a telephone number, and the encoded data indicates the telephone number to dial. As before, step one 1 involves providing a printed publication with indicia of the QR code 410. The mobile phone 110*c* reads the QR code in step two 2. This results in the mobile phone 110*c* dialing a voice call in step three 3 to the call center 270.

Upon receipt of the call, the call center 270 may provide in step four 4 information about the call, including the calling (or originating) telephone number, the called (or destination) telephone number, and the time and date, to the contact information database 425. The call center may also provide the same or similar information to the electronic consent database 252. The call center 270 can answer the call, and an agent can speak with the caller. If no agent is available to answer the call, the caller may be prompted by an IVR to leave a message, and a call back in step six 6 is performed at a later time.

FIG. 4C illustrates that the QR code 410 can be used to initiate a telephone call. Other embodiments, which are not shown, include using the QR code 410 to send an email from the mobile phone 110*c*. In other embodiments, the QR code 410 will cause text to be displayed to the user providing them instructions for the number to dial, a context code to enter, or other actions to perform. The call center, upon receipt of the communication, records data reflective of the electronic consent in the electronic consent database 252.

Figure 5:
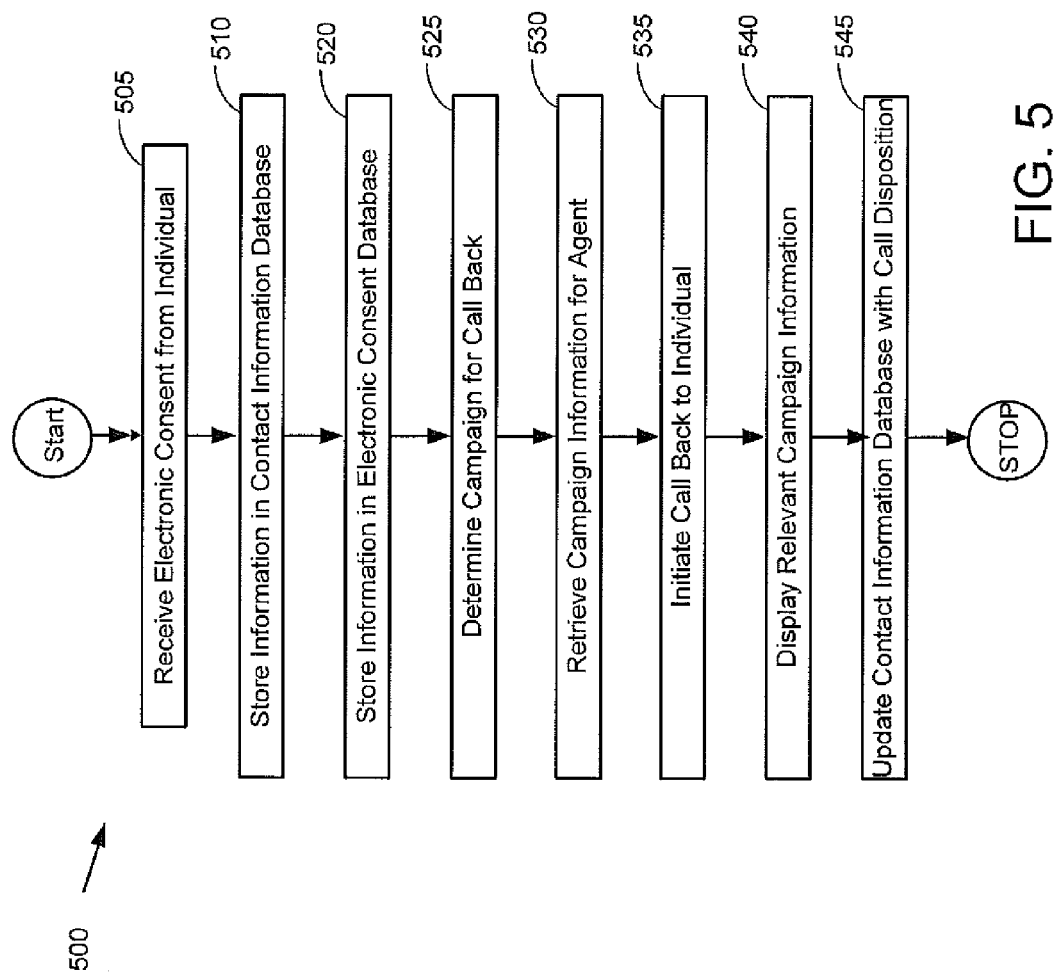
FIG. 5 shows one embodiment of a data structure used to manage electronic consent for a list of telephone numbers.

The processing that occurs in the call center 270 is dependent on the particular message flow as describe above. One embodiment of the processing flow that the call center may perform is shown in FIG. 5. This embodiment is relevant to the mobile phone sending an SMS message that is received by the call center.

The process 500 begins with operation 505 in which electronic consent is received from the mobile phone. The electronic consent can be in the form of an SMS message and can comprise a text body portion, but other forms may be used, such as email. In operation 510, the call center stores information about the instance of contact in a contact information database. This can be used for various purposes, such as maintaining potential customer contact information, managing data to measure the effectiveness of the advertising campaign, etc.

In operation 520, information is stored in an electronic consent database. In some embodiments, the electronic consent database could be integrated with the contact information database. In this embodiment, two distinct databases are used. Thus, the electronic consent database is used for only storing electronic consent related information. This could include e.g., the SMS message itself, along with metadata indicating the originating telephone number, the destination telephone number, time of day, etc.

In operation 525, the call center examines the SMS message to determine the campaign the SMS message is associated with. This can be done by analyzing the destination number, the contents of the text portion of the SMS message, or both. For example, the text of the SMS message may uniquely identify a campaign, and the text can be parsed to determine the campaign the SMS message is associated with. In another embodiment, a campaign code could be embedded within the SMS text body. For example, the message received could state: "Please have someone call me back about your new widget product. Campaign code 1234." The identification of the campaign can be accomplished in various ways. Typically, a campaign identifier is determined from the SMS message with the identifier being an alphanumeric identifier. Other forms may be strictly numeric.

Once the calling campaign is identified, then in operation 530 the campaign information can be retrieved. This includes information about the product involved, agent scripts to be presented to an agent, how call metrics are to be processed, etc. This may be done by the ACD, dialer, or CTI server, or other component in the call center. The campaign information, including potentially the contents of the SMS message, can be displayed to the agent on their workstation. In operation 535, the call back to the originating party is initiated. At the same time, operation 540 may occur, which displays the relevant campaign information on the selected agent's computer. These operations can occur in different order than presented above, and further operations may be involved.

After the call back is completed, the agent then completes the necessary post-call processing, which may include providing a call disposition code as to the status of the call back. This information may be provided to the contact information database in operation 545 to provide further information about the call and allows further measurement of the effectiveness of the campaign. However, this call status does not have to be provided to the electronic consent database 252.

Data Structure

The data structure generated by the call center (or other component as appropriate) and stored in the contact information database and/or the electronic consent database is discussed next. As noted above, some of the information in the two databases may be the same. However, the contact information database may store additional information for marketing analysis, which is not germane to the electronic consent database. For example, the call disposition code may not be relevant for electronic consent, but may be important for ascertaining the marketing campaign effectiveness. Thus, the data structure shown in FIG. 6 is only illustrative, and more or less information would be present when examining the data elements for either of the contact information database or the electronic consent database.

In FIG. 6, the data structure 600 is shown as comprising various columns. The first column 605 is a URL, link, or pointer to the electronic consent data itself. In some embodiments, the electronic consent data itself could be stored, but in this embodiment, a link is provided to that data. The link structure can accommodate identifying various forms, including, e.g., voice recordings, emails, scanned images, text messages, facsimiles, etc. If the consent were limited to, e.g., SMS messages, then the message itself could be stored in the first column.

The second column 610 indicates the form of the electronic consent, which is only required if there is more than one format. In this embodiment, the electronic consent could be at least either in a SMS form or a voice form. The next column 615 is the originating address, which may be a telephone number, from which the consent is received. If the consent is in SMS form, then this column indicates the originating telephone number in the SMS message. If the consent was provided via a voice recording (as a result of the caller originating a voice call), then the telephone number would set equal to the calling party number or "ANI" (automatic number identification) associated with the incoming call.

The fourth column 620 is the date the electronic consent was received. This value may be used to set an expiration date for the electronic consent, which can be set to automatically expire. For example, in one embodiment the electronic consent can be set to expire three months after receipt, or in another embodiment, five years from receipt. This can be done by the same system component that wrote the data into the database, or a date could be added into the record indicating the expiration date.

The fifth column 625 records a campaign identifier, which can be used to identify the campaign for which the consent was obtained. This could be unique to an enterprise, or may include information that explicitly identifies the enterprise (such as an enterprise identifier) or other identifier which links the campaign to the enterprise.

In other embodiments, different or additional columns may be used to define data that is stored. For example, if the data structure 600 was used in a contact information database, then call disposition information may be stored. However, if the data structure 600 was for an electronic consent database, then call disposition information may not be stored.

The example shows three rows 650, 660, 670, which illustrate different records that may be generated by the call center. The first row 650 provides an identifier for linking to the electronic consent, which is in SMS format and was generated from the originating telephone number 404 555-1212. This was received by the call center on 3-1-2012 (Mar. 1, 2012), and was received in association with campaign 4125. This value may be used to identify the enterprise. The second row 660 also reflects receipt of an SMS form of electronic consent. The third row 670 reflects that the electronic consent was provided in voice form, and the link in first column provides a URL to the voice recording. The campaign identifier in this row (which is different relative to the first two rows) can be used to identify which enterprise the voice consent was provided in regard to.

Various data structures can be defined in light of the above, and FIG. 6 represents only one embodiment of how electronic consent may be recorded, referenced, and retrieved to ensure compliance with various communication regulations. Those skilled in the art will be able to define various other formats in light of the present disclosure.

Exemplary Computer Processing Device Architecture

Figure 7:
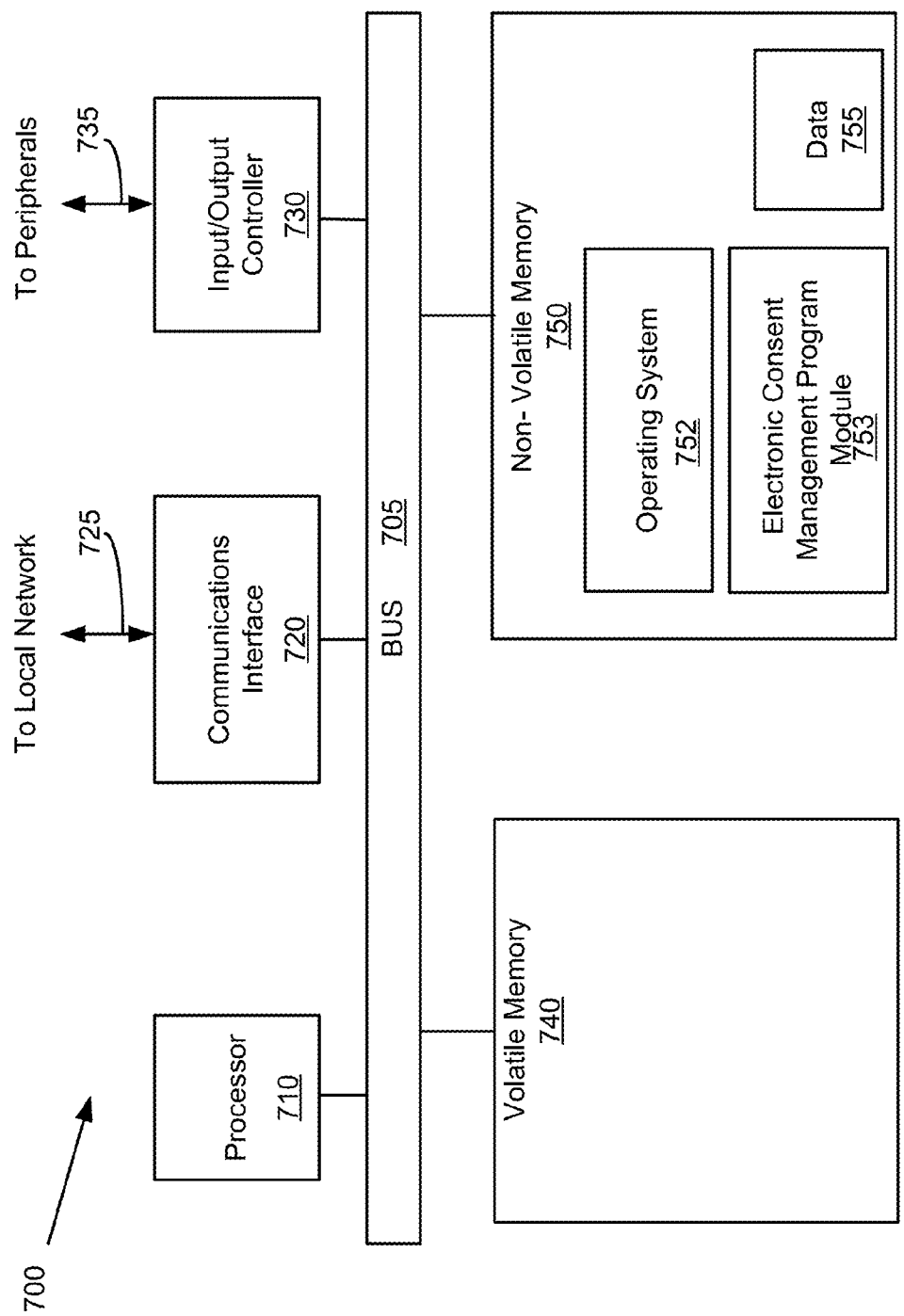
FIG. 7 is an exemplary schematic diagram of a computer processing device used in one embodiment to practice the technologies disclosed herein.

As discussed in conjunction with FIG. 1 and FIG. 2, the call center architecture 100 may comprise various components, such as servers, front end, databases, that comprise a processing system. FIG. 7 is an exemplary schematic diagram of a computer processing system that may be used in an embodiment of the call center architecture to practice the technologies disclosed herein. FIG. 7 provides an exemplary schematic of a processing system 700, which could represent individually or in combination, for example, the ACD 130, CTI server 145, dialer 150, front end 254, TN list database 255, electronic consent database 252, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via the local network 170 with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc.

The processor 710 may be configured to execute instructions stored in volatile memory 740, non-volatile memory 750, or other forms of computer readable storage media accessible to the processor 710. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. Specifically, the non-volatile memory 750 may store one or more electronic consent management program modules 753 and/or operating system code 752 containing instructions for performing the process and/or functions associated with the technologies disclosed herein. The electronic consent management program modules 753 may also access, generate, or store data 755, such as the aforementioned records and data, in the non-volatile memory 750, as well as in the volatile memory 740. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 710. These may form a part of, or may interact with, the electronic consent management program modules 753.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory, computer readable medium storing computer-executable instructions thereon that when executed by a computer processor cause the computer processor to:
receive a short message service ("SMS") message comprising an electronic consent for receiving at least one subsequent communication, the message sent by a camera-equipped mobile phone in response to reading a two dimensional barcode ("2D Barcode") provided on an advertisement associated with an advertising campaign, wherein the 2D Barcode is encoded to indicate an action to be performed by the camera-equipped mobile phone, the action comprising transmitting text data encoded by the 2D Barcode uniquely identifying the advertising campaign and requesting a subsequent communication associated with a product or service indicated by the advertisement;
identify an originating telephone number associated with the SMS message;
determine a campaign identifier by analyzing the text data uniquely identifying the advertising campaign in the SMS message, wherein the campaign identifier identifies the advertising campaign;
store in a database the text data, the originating telephone number, the campaign identifier, and a received date indicating when the SMS message was received as proof of receiving the electronic consent;
receive a request for proof of the electronic consent, wherein the request for proof originates from a computer processing system in a call center and the request is associated with the originating telephone number; and
in response to receiving the request:
compare the originating telephone number to a list of do-not-call telephone numbers;
in response to the originating telephone number matching one of the do-not-call telephone numbers on the list, determine whether the received date is later than a second date on which the do-not-call telephone number on the list matching the originating telephone number was added to the list; and
in response to determining the received date is later than the second date, provide at least the campaign identifier to the computer processing system.

2. The non-transitory, computer readable medium of claim 1, wherein the campaign identifier is uniquely associated with an enterprise.

3. The non-transitory, computer readable medium of claim 1, wherein the subsequent communication is a SMS message sent to the mobile phone.

4. The non-transitory, computer readable medium of claim 1, wherein the computer-executable instructions further cause the computer processor to set an expiration date of the electronic consent.

5. A computer implemented method for managing an electronic consent for receiving at least one subsequent communication provided by an individual to an enterprise, the method comprising:
receiving a short message service ("SMS") message comprising the electronic consent sent by a camera-equipped mobile phone in response to reading a two dimensional barcode ("2D Barcode") provided on an advertisement associated with an advertising campaign, wherein the 2D Barcode is encoded to indicate an action to be performed by the camera-equipped mobile phone, the action comprising transmitting text data encoded by the 2D Barcode uniquely identifying the advertising campaign and requesting a subsequent communication associated with a product or service indicated by the advertisement;
identifying an originating telephone number associated with the SMS message by a computer processor;
determining a campaign identifier by the computer processor analyzing the text data uniquely identifying the advertising campaign in the SMS message, wherein the campaign identifier identifies the advertising campaign;
storing in a database the text data, the originating telephone number, the campaign identifier, and a received date when the SMS message was received as proof of receiving the electronic consent;
receiving a request for proof of the electronic consent by the computer processor, wherein the request for proof originates from a call center and the request is associated with the originating telephone number; and
in response to receiving the request:
comparing the originating telephone number to a list of do-not-call telephone numbers by the computer processor;
in response to the originating telephone number matching one of the do-not-call telephone numbers on the list, determining by the computer processor whether the received date is later than a second date on which the do-not-call telephone number on the list matching the originating telephone number was added to the list; and
in response to determining the received date is later than the second date, providing at least the campaign identifier to the call center.

6. The method of claim 5 further comprising setting an expiration date of the electronic consent by the computer processor.

7. The method of claim 5, wherein the subsequent communication is a SMS message sent to the mobile phone.

8. A system for recording an electronic consent received from a user for receiving at least one subsequent communication comprising:
a database; and
a processor configured to:
receive a short message service ("SMS") message sent by a camera-equipped mobile phone in response to reading a two dimensional barcode ("2D Barcode") provided on an advertisement associated with an advertising campaign, wherein the 2D Barcode is encoded for the camera-equipped mobile phone to perform an action, the action comprising transmitting text data encoded by the 2D Barcode uniquely identifying the advertising campaign and requesting a subsequent communication associated with a product or service indicated by the advertisement,
identify an originating telephone number associated with the SMS message,
determine a campaign identifier associated with the advertising campaign by analyzing the text data uniquely identifying the advertising campaign in the SMS message, and
store the text data, the originating telephone number, a received date, and the campaign identifier in the database;

receive a request for proof of the electronic consent, wherein the request for proof is originated from another system in a call center and the request is associated with the originating telephone number; and in response to receiving the request:
retrieve the received date from the database;
compare the originating telephone number to a list of do-not-call telephone numbers;
in response to the originating telephone number matching one of the do-not-call telephone numbers on the list, determine whether the received date is later than a second date on which the do-not-call telephone number on the list matching the originating telephone number was added to the list; and
in response to determining the received date is later than the second date, provide at least the campaign identifier to the system in the call center.

9. The system of claim 8, wherein the subsequent communication is a SMS message sent to the mobile phone.

10. The system of claim 8, wherein the computer processor is further configured to set an expiration date of the electronic consent.

* * * * *